Nov. 5, 1968  J. L. LEONARD  3,409,064
PNEUMATIC TIRES

Filed March 7, 1966  2 Sheets-Sheet 1

INVENTOR
JACK LONSDALE LEONARD

BY Rauber & Lazar
HIS ATTORNEYS

United States Patent Office 3,409,064
Patented Nov. 5, 1968

3,409,064
PNEUMATIC TIRES
Jack Lonsdale Leonard, Sutton Coldfield, England, assignor to The Dunlop Company Limited, London, England, a British company
Filed Mar. 7, 1966, Ser. No. 532,184
Claims priority, application Great Britain, Mar. 12, 1965, 10,478/65
9 Claims. (Cl. 152—209)

ABSTRACT OF THE DISCLOSURE

A pneumatic tire adapted especially for use over wet surfaces having a tread portion provided with a circumferential groove defining a circumferential rib which in turn has lateral ribs defined by lateral grooves. Water-absorbing chambers, such as cylinders extending into the tread, are disposed in the ribs for storing water during contact of the tire with the wet surface and throwing clear such stored-water by centrifugal action by the rolling tire clearing the surfaces. Water is carried also in the grooves and thrown clear also by rolling of the tire.

---

This invention relates to pneumatic tires and more particularly to treads for pneumatic tires.

Great difficulty has been experienced in the removal by pneumatic tires of water lying upon a road surface. Pneumatic tire braking and driving forces are transmitted through a flattened area of the tire in contact with the ground and while under normal low speed, dry road conditions, the whole of the contact area is effective for the transmission of these forces, a proportion of the contact area becomes ineffective under wet road conditions at speed since it is isolated from the road surface by a film of water. The difficulty is greatly accentuated when the vehicle travels through the water at high speed, for example at 60 m.p.h. or more, and the greater the speed of the vehicle, the smaller the effective contact area of each tire with the ground since the vehicle tends to ride over the water. At a certain minimum speed depending upon the weight of the vehicle, the tires with which it is fitted and the tire inflation pressure, and the amount of water lying upon the road surface, the tires will rid completely over the water and be isolated from the road surface by a water film. This has become known as "vehicle aquaplaning."

It will be appreciated, therefore, that the length of the effective contact area of tire tread with the ground for each tire becomes shorter with increasing speed and that, at the same time, there is a reduced duration during which water can be removed prior to the establishment of effective road contact, e.g. at 60 m.p.h. the duration of time of any part of the tread in the whole of the contact area, part of which as will be appreciated is ineffective, is approximately 0.007 second and the time available for establishing tire grip at increasing speeds is reduced in proportion to the reduction in effective contact area.

It is therefore imperative to remove water from the road surface, prior to and in the contact area, with the greatest possible speed and this has been achieved, in the past, by physical displacement of water by the tire, after the manner of a bow wave created by a boat, and by the provision of circumferential drainage grooves, but these are not sufficiently effective at high speed to avoid serious loss of grip of aquaplaning.

According to the invention a pneumatic tire has a tread portion, the ground-contacting surface of which is provided with at least one generally circumferential rib and generally circumferential grooves one on each side of the rib, the rib having a plurality of water-absorbing chambers formed therein open to the ground-contacting surface of the rib and each chamber having, measured at said surface, a length not greater than three times the width thereof.

In one construction of tire as described above each chamber is closed at its radially inner end and extends from the ground-contacting surface of the rib to a depth of between 50% and 100% of the groove depth measured radially inwardly from the surface. For example, in a car tire of size 6.00L–13, each chamber extends radially inwardly from the ground-contacting surface of the rib to a depth of 0.1 inch, the diameter of each such chamber is 0.09 inch and the average distance between the centres of adjacent chambers is 0.4 inch, measured at the ground-contacting surface of the rib.

It is preferred that each chamber is surrounded by the material of the rib at the road-contacting surface thereof and also preferably each chamber is of hollow cylindrical form.

It is also not necessary that the water-absorbing chambers should be cylindrical; the chambers may be, for example, crescent-shaped, lozenge-shaped or rectangular in shape, in all instances the length of the chamber being not greater than three times the width thereof, the width being defined as the maximum transverse dimension of the chamber at the ground-contacting surface of the rib. Water-absorbing chambers in the form of slots are described in our co-pending British patent application No. 16,415/64, the length of the slots being considerably greater than three times the width thereof. It will be appreciated that the water-absorbing chambers referred to in the present specification are not slots in the sense of the use of this word in the specification of the co-pending patent application just referred to.

A tire may be provided with water-absorbing chambers of the kind referred to in the present specification along a part of a circumferential rib or along one or more of a plurality of ribs, constituting a whole tread pattern the remainder of the part rib or the remaining ribs of the pattern, respectively, having water-absorbing chambers of the kind referred to in the previously-mentioned co-pending patent application.

One embodiment of the invention will now be described in more detail with reference to the accompanying drawings wherein.

Figure 1:
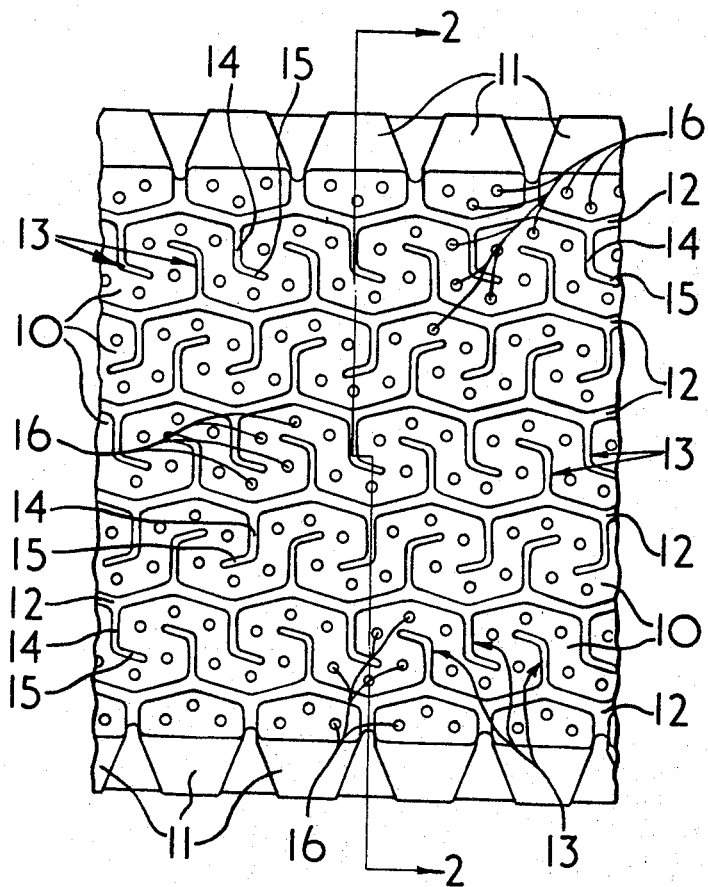
FIGURE 1 is a plan view of the tread pattern of a part of a pneumatic tire.
Figure 2:
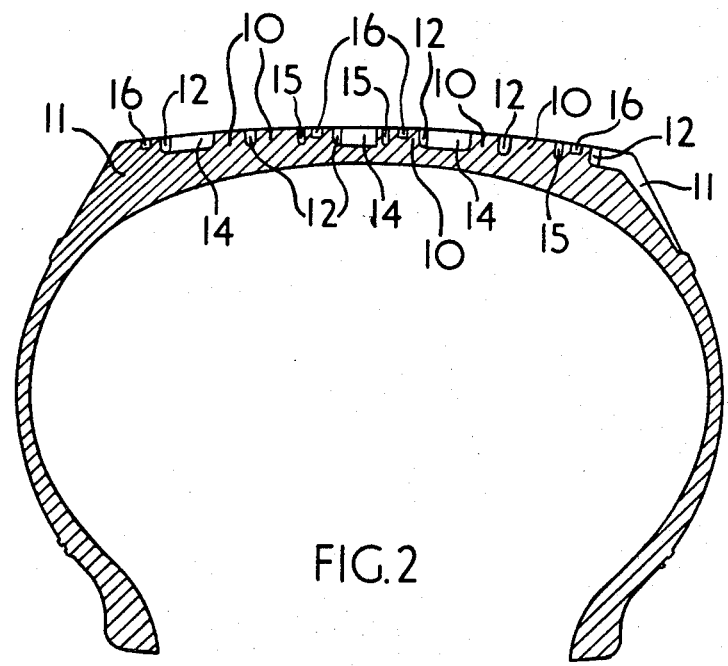
FIGURE 2 is a sectional view of the tire taken on the line 2—2 of FIGURE 1.

The invention is of particular value in respect of high speed tires where it is desirable that the pattern should not be cut up excessively since this may lead to a high rate of wear.

A high speed tire of size 6.00L–13 is provided with five generally circumferentially extending ribs 10 of zig-zag form located symmetrically about the mid-circumferential plane of the tire, each shoulder of the tire being provided with a plurality of blocks 11 arranged in a circumferential line, the blocks fitting complementarily with the zig-zag formation of the circumferential ribs adjacent to the shoulder in the case of each shoulder. It will be appreciated, therefore, that each of the circumferential ribs 10 and the axially outermost of these ribs and the shoulder blocks 11 are separated by grooves 12, the average depth of the grooves being 0.2 inch.

Each circumferential rib 10 is also formed with a plurality of uniformly spaced-apart transverse slots 13 opening from each groove 12 and having a first part 14 extending normal to the circumferential plane of the tire. Each slot 13, at its end remote from the groove 12 from which it extends, is formed with a second part 15 disposed at an obtuse angle to the first part 14 and being substantially parallel to but spaced away from the opposite axial edge of the rib.

Each of the circumferential ribs 10 is provided with a plurality of cylindrical water-absorbing chambers 16 which extend from the ground-contacting surface of the rib radially inwardly to a depth of 0.1 inch. Since the chambers 16 are cylindrical in form, the length of the chamber compared with its width, measured across the ground-contacting surface of the tread, has the ratio of 1:1, the diameter of each chamber being 0.09 inch. The average spacing between adjacent chambers is 0.4 inch measured centre to centre and the average distance measured from the centre of a chamber to the nearest edge of a rib 10 flanking either a slot 13 or a groove 12 is 0.2 inch. It will be appreciated, therefore, that there is a high degree of concentration of water-absorbing chambers 16 on the ground-contacting surface and the operation of the tire is as follows.

When the tire is driven at a high speed, for example, 90–100 m.p.h., through standing water on the surface of a track, the leading edge of the tire, just prior, in the sense of tire rotation, to the contact area, physically displaces a certain volume of water from the track surface next to be rolled upon the tire. This is a preliminary water removal stage, the next stage being the action of riding over the volume of water remaining, by the leading portion of the contact area of the tire, so that the effective contact area is reduced. During this stage, and later, water is displaced by the tire transversely into the circumferential grooves 12 which act as water conduits.

The tire of the present invention, however, in contrast to tires which are now commonly used is provided with water-absorbing chambers 16 which operate as local reservoirs to soak up the remaining film of water in the path of the rolling tire and the water-absorbing capacity of these chambers is such that the effective contact area is not further reduced and is adequate to provide safe handling of the vehicle to which the tire is fitted during braking and cornering. When the portion of the tire in the contact area rolls clear, the water in the chambers and grooves is thrown clear by the centrifugal action of the rotating tire.

While the water-absorbing chambers 16, in the preceding embodiment, have been described as being of cylindrical shape, many other shapes, as has been indicated, are within the scope of the invention and it is not necessary that the chambers should extend truly radially inwardly from the ground-contacting surface. They may be inclined in other directions and they may swell out as they extend radially inwardly to provide an increased water-absorbing capacity.

Although the one embodiment of tire hereinbefore described relates to a high speed tire of size 6.00L–13 it should be appreciated that tires according to the invention may be manufactured over a varied range of sizes and within such a range the dimensions and spacings of the water-absorbing chambers will also vary. The circumferentially extending ribs 10 may vary in axial pitch between 0.9 inch and 1.36 inches and may vary in circumferential pitch between 1.20 inches and 1.26 inches. When the chambers are of cylindrical form their diameters may vary between 0.06 inch and 0.19 inch and the spacings between the centres of adjacent chambers may vary between 0.19 inch and 0.5 inch, these measurements being at the ground-contacting surface of the rib.

Having now described my invention, what I claim is:

1. A pneumatic tire comprising a tread portion, at least one generally circumferential rib defining a ground-contacting surface of the tread portion, the tread portion having generally circumferential grooves formed therein one on each side of the rib and the rib having a plurality of water-absorbing chambers formed therein open to the ground-contacting surface of the rib, the average distance between the centers of adjacent chambers lying between 0.19 inch to 0.05 inch measured at the said surface, and each chamber having, measured at said surface, a length between 0.06 inch and 0.19 inch and not greater than three times the width thereof.

2. A pneumatic tire as claimed in claim 1 wherein each chamber is closed at its radially inner end.

3. A pneumatic tire as claimed in claim 1 wherein each chamber extends from the ground-contacting surface of the rib to a depth of between 40% and 100% of the groove depth measured radially inwardly from said surface.

4. A pneumatic tire as claimed in claim 3 wherein each chamber extends from the ground-contacting surface of the rib to a depth of between 40% and 60% of the groove depth measured radially inwardly from said surface.

5. A pneumatic tire as claimed in claim 1 wherein the depth of the groove, measured radially inwardly from the ground-contacting surface of the rib lies between 0.15 inch and 0.25 inch.

6. A pneumatic tire as claimed in claim 1 wherein each chamber is surrounded by the material of the rib at the ground-contacting surface thereof.

7. A pneumatic tire as claimed in claim 1 wherein each chamber is of hollow cylindrical form.

8. A pneumatic tire as claimed in claim 1 wherein the width, of some at least, of the chambers, is greater at the radially inner ends of the chambers than the width at the ground-contacting surface of the rib.

9. A pneumatic tire as claimed in claim 1 wherein some at least, of the chambers extend radially inwardly into the rib at an angle offset from the respective true radial axes of the tire passing through the centres of the chambers at the ground-contacting surface of the rib.

References Cited

UNITED STATES PATENTS

| | | | |
|---|---|---|---|
| 3,185,199 | 5/1965 | Klingemann et al. | 152—209 |
| 2,759,512 | 8/1956 | Schlichtmann | 152—209 |

FOREIGN PATENTS

| | | |
|---|---|---|
| 116,250 | 12/1942 | Australia. |
| 691,659 | 10/1930 | France. |

ARTHUR L. LA POINT, *Primary Examiner.*